No. 618,450. Patented Jan. 31, 1899.
J. K. WORRELL.
INSECT EXTERMINATOR.
(Application filed May 2, 1898.)
(No Model.)
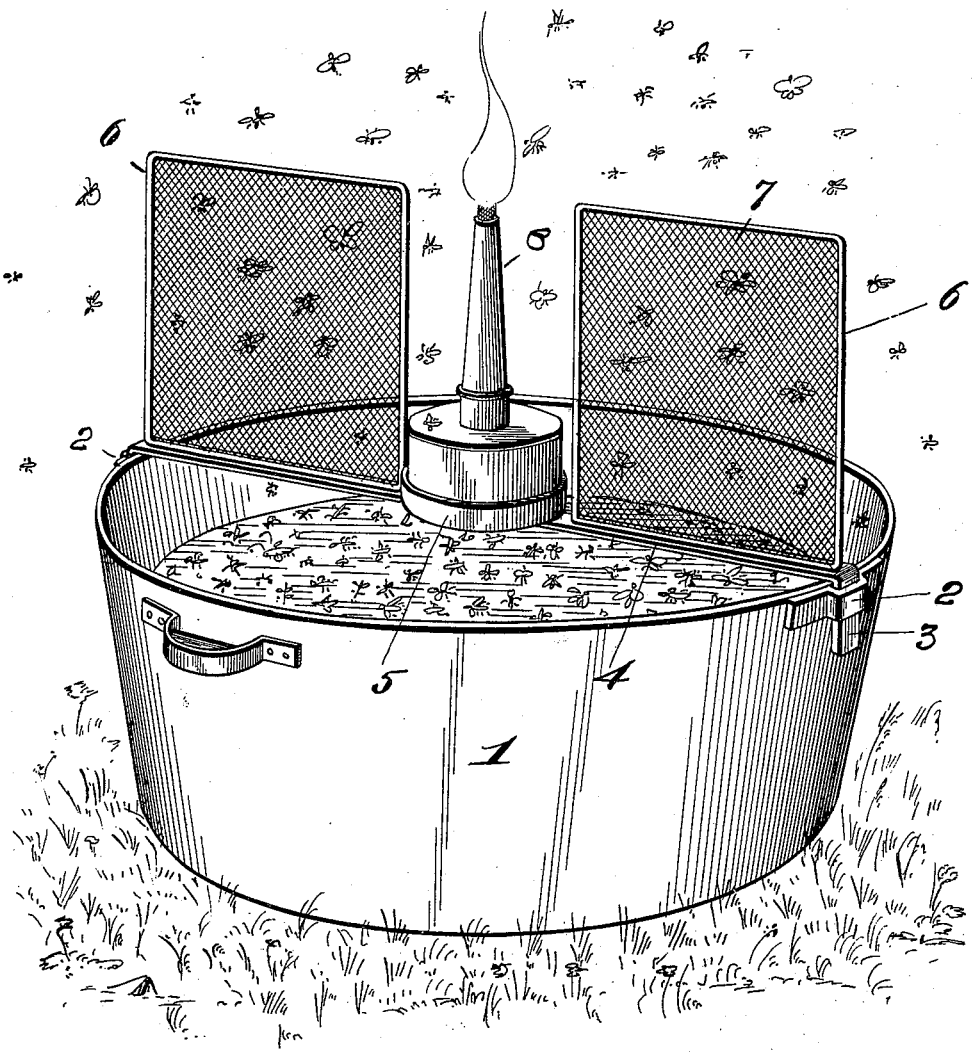
Attest:
W. F. Smith
M. Griffin
Inventor:—
James K. Worrell
By Higdon Longan
Attys.

UNITED STATES PATENT OFFICE.

JAMES K. WORRELL, OF ESTILL, MISSOURI.

INSECT-EXTERMINATOR.

SPECIFICATION forming part of Letters Patent No. 618,450, dated January 31, 1899.

Application filed May 2, 1898. Serial No. 679,500. (No model.)

*To all whom it may concern:*

Be it known that I, JAMES K. WORRELL, of the city of Estill, Howard county, State of Missouri, have invented certain new and useful Improvements in Insect-Exterminators, of which the following is a full, clear, and exact description, reference being had to the accompanying drawing, forming a part thereof.

My invention relates to insect-exterminators; and it consists of the novel construction, combination, and arrangement of parts hereinafter shown, described, and claimed.

The figure is a perspective view of an insect-exterminator of my improved construction.

Referring by numerals to the accompanying drawing, 1 indicates an open-topped receptacle suitable for holding liquid, on the outside of the upper edges thereof there being located the oppositely-arranged loops 2. These loops serve as seats for the downwardly-turned outer ends 3 of the transversely-arranged bar 4, that extends across the receptacle 1, upon the top of the center of which bar 4 is located a circular seat 5. Fixed to the top sides of this bar 4, on each side of the circular plate 5, are the vertically-arranged rectangular frames 6, which carry the sections of wire-netting 7. Removably located upon the plate 5 is a lamp 8 or like device for creating a flame.

When it is desired to use my improved insect-exterminator, the same is located at a point frequented by insects, and at night the lamp is lighted and the receptacle is filled with a chemically-prepared liquid, which will kill the insects as soon as they drop into said liquid. The flame of the light 8 attracts the insects, and as they circle around said flame they will sooner or later fly against the screens 7, and thereby be deflected into the liquid-containing receptacle 1 and therein be killed.

A device so constructed is simple, inexpensive, and very efficient in use. It can be readily transported from one point to another, and as the liquid within the receptacle 1 can be prepared at a very slight cost and will last some time the device is very cheaply operated and does not require any attention after being prepared for use.

I claim—

An insect-exterminator, constructed with a liquid-containing receptacle, a bar removably arranged across the top of said receptacle, a lamp removably located upon the center of said bar, and wire-net deflectors arranged upon said bar on each side of said lamp, substantially as specified.

In testimony whereof I affix my signature in presence of two witnesses.

JAMES K. WORRELL.

Witnesses:
C. L. RAWLINS,
J. C. HEUTH.